United States Patent [19]
Hale et al.

[11] Patent Number: 6,029,106
[45] Date of Patent: Feb. 22, 2000

[54] GLOBAL POSITION CORRECTION FOR THE ELECTRONIC DISPLAY OF FIELD MAPS

[75] Inventors: George H. Hale, Naperville; Keith W. Wendte, Lemont; Paul W. Haack, Crystal Lake, all of Ill.

[73] Assignee: Case Corporation, Racine, Wis.

[21] Appl. No.: 08/755,205

[22] Filed: Nov. 22, 1996

[51] Int. Cl.[7] .............................. A01B 79/00; G01C 21/00
[52] U.S. Cl. .............................. 701/50; 701/215; 342/357
[58] Field of Search .............................. 701/50, 207, 213, 701/215; 342/357, 358; 340/988, 990, 995

[56] References Cited

U.S. PATENT DOCUMENTS

| | | |
|---|---|---|
| Re. 35,100 | 11/1995 | Monson et al. . |
| 4,578,678 | 3/1986 | Hurd . |
| 4,630,773 | 12/1986 | Ortlip . |
| 4,675,676 | 6/1987 | Takanabe et al. . |
| 4,736,303 | 4/1988 | Itoh et al. . |
| 4,792,907 | 12/1988 | Ikeda et al. . |
| 4,949,268 | 8/1990 | Nishikawa et al. . |
| 5,084,822 | 1/1992 | Hayami . |
| 5,214,757 | 5/1993 | Mauney et al. . |
| 5,220,509 | 6/1993 | Takemura et al. . |
| 5,282,389 | 2/1994 | Faivre et al. . |
| 5,396,431 | 3/1995 | Shimizu et al. . |
| 5,398,034 | 3/1995 | Spilker, Jr. . |
| 5,416,712 | 5/1995 | Geier et al. . |
| 5,421,416 | 6/1995 | Orbach et al. . |
| 5,428,544 | 6/1995 | Shyu . |
| 5,440,484 | 8/1995 | Kao . |
| 5,452,211 | 9/1995 | Kyrtsos et al. . |
| 5,455,769 | 10/1995 | Panoushek et al. . |
| 5,467,271 | 11/1995 | Abel et al. . |
| 5,469,158 | 11/1995 | Morita . |
| 5,490,073 | 2/1996 | Kyrtsos . |
| 5,497,149 | 3/1996 | Fast . |
| 5,510,798 | 4/1996 | Bauer . |
| 5,517,419 | 5/1996 | Lanckton et al. . |
| 5,523,765 | 6/1996 | Ichikawa . |
| 5,525,998 | 6/1996 | Geier . |
| 5,526,002 | 6/1996 | Gudat et al. . |
| 5,526,291 | 6/1996 | Lennen . |
| 5,646,846 | 7/1997 | Bruce et al. .............................. 701/50 |
| 5,754,137 | 5/1998 | Dürrstein .............................. 342/357 |
| 5,809,440 | 9/1998 | Beck et al. .............................. 701/213 |

FOREIGN PATENT DOCUMENTS

WO 95/02318   1/1995   WIPO .

OTHER PUBLICATIONS

Brochure: Advanced Farming Systems, ©1996 Case Corporation.

Brochure: John Deere Greenstar Combine Yield–Mapping System, John Deere.

Report No. 94–D–139, Site Specific Yield Measurement in Combines and Forage Harvesting Machines, Ageng—Milano '94.

(List continued on next page.)

*Primary Examiner*—Gary Chin
*Attorney, Agent, or Firm*—Foley & Lardner

[57] ABSTRACT

A field mapping system for an agricultural vehicle such as a combine or tractor is disclosed herein. The system includes a location signal generator for determining the position of the vehicle relative to a field, a correction signal generator for receiving correction signals used to improve the accuracy of the position determination and a sensing circuit for detecting a characteristic (e.g., grain moisture, grain flow, soil compaction, soil moisture) at predetermined locations of the vehicle within the field. The system also includes an electronic display controlled by a control circuit coupled to the location signal generator, the correction signal generator, and the sensing circuit. The control circuit applies signals to the electronic display which produces a map of the field which includes indicia of the characteristic at respective locations within the field. For example, if the characteristic is grain moisture, different colors can be used on the display to represent different moisture levels.

45 Claims, 12 Drawing Sheets

OTHER PUBLICATIONS

The Use of GPS in Agriculture for Yield Mapping and Tractor Implement Guidance, DGPS '91 Symposium, vol. II, Seite 455–465.

Yield Monitoring Experiences—1994, ASAE Winter Meeting, Atlanta, GA, Dec. 16, 1994.

Six–Ply Precision Layers of Computerized Information Allow Fine–Tuned Crop Production, Top Producer/Jan. 1995.

Farming with Satellites the Future of Farming?, FarmWeek, p. 3, Monday, Feb. 24, 1992.

Field Positioning Technology, Soybean Digest, HighTech Tools, pp. 23–25, Winter 1992.

Tools with Eyes, Farm Journal / Mid–Mar., 1989.

Data Acquisition for Yield Mapping with Combine Harvesters Computers in Agriculture, ASAE 1994.

Accuracy from Afar, Top Producer / Feb. 1992.

Accuracy to the Inch, Top Producer / Jan. 1995.

Sensing and Mapping Grain Yield Variation, Automated Agriculture for the $21^{st}$ Century, ASAE Pub. 11–91.

Robotics and Intelligent Machines in Agriculture, ASAE—Proceedings—the First International Conference on Robotics . . . —Oct. 2–4, 1983.

Control Concepts for Tillage Systems—Robert L. Schafer—Dec. 1981.

Control System for Combine Harvesters—Report by Kotyk et al.

Brochure: Introducing the Greenstar Combine Yeild–Mapping System (What is the Greenstar Combine Yield–Mapping System?).

Brochure: Hiniker 8150 Control System—The Simple and Economical Solution to Accurate Chemical and Fertilizer Application.

Brochure: Hiniker 8200 Monitor—The Most Versatile Low Cost Acre Monitor on the Market.

Site Specific Farming's Second Wave—Bryce Knorr; Mar. 1995.

3rd International Conference on Land Vehicle Navigation—Prof. Dr. Kurt Biedonkopf; Jun. 14–16, 1994.

Data Acquisition For Yield Mapping With Combine Harvesters—P. Reitz and H.D. Kutzbach.

Global Positioning System Applications—A1 Demmler; Apr. 1994.

Where in the World?—Ron Harbour; AgMAPPING Jun. 1991.

Reitz, P., Kutzbach, H.D. "Investigations on a Particular Yield Mapping System for Combine Harvesters"; *Computers and Electronics in Agriculture*; pp. 137–150; 1996.

Auernhammer et al. "GPS for Yield Mapping on Combines"; *Computers and Electronics in Agriculture*; pp. 53–68; 1994.

PCT Form/ISA/220, International Search Report for Application, PCT/US 97/21039; Feb. 4, 1998.

| DATA POINT NO. | BU /ACRE | MOISTURE | LONGITUDE | LATITUDE | ... |
|---|---|---|---|---|---|
| 1 | 32.0739 | 17.7 | −88.7291520 | 39.0710720 | |
| 2 | 56.5808 | 18.1 | −88.7291140 | 39.0710720 | |
| 3 | 64.1104 | 17.1 | −88.7290720 | 39.0710740 | |
| 4 | 96.1741 | 16.4 | −88.7290320 | 39.0710760 | |
| 5 | 105.247 | 15.9 | −88.7289890 | 39.0710740 | |
| . | . | . | . | . | |
| . | . | . | . | . | |
| . | . | . | . | . | |

200

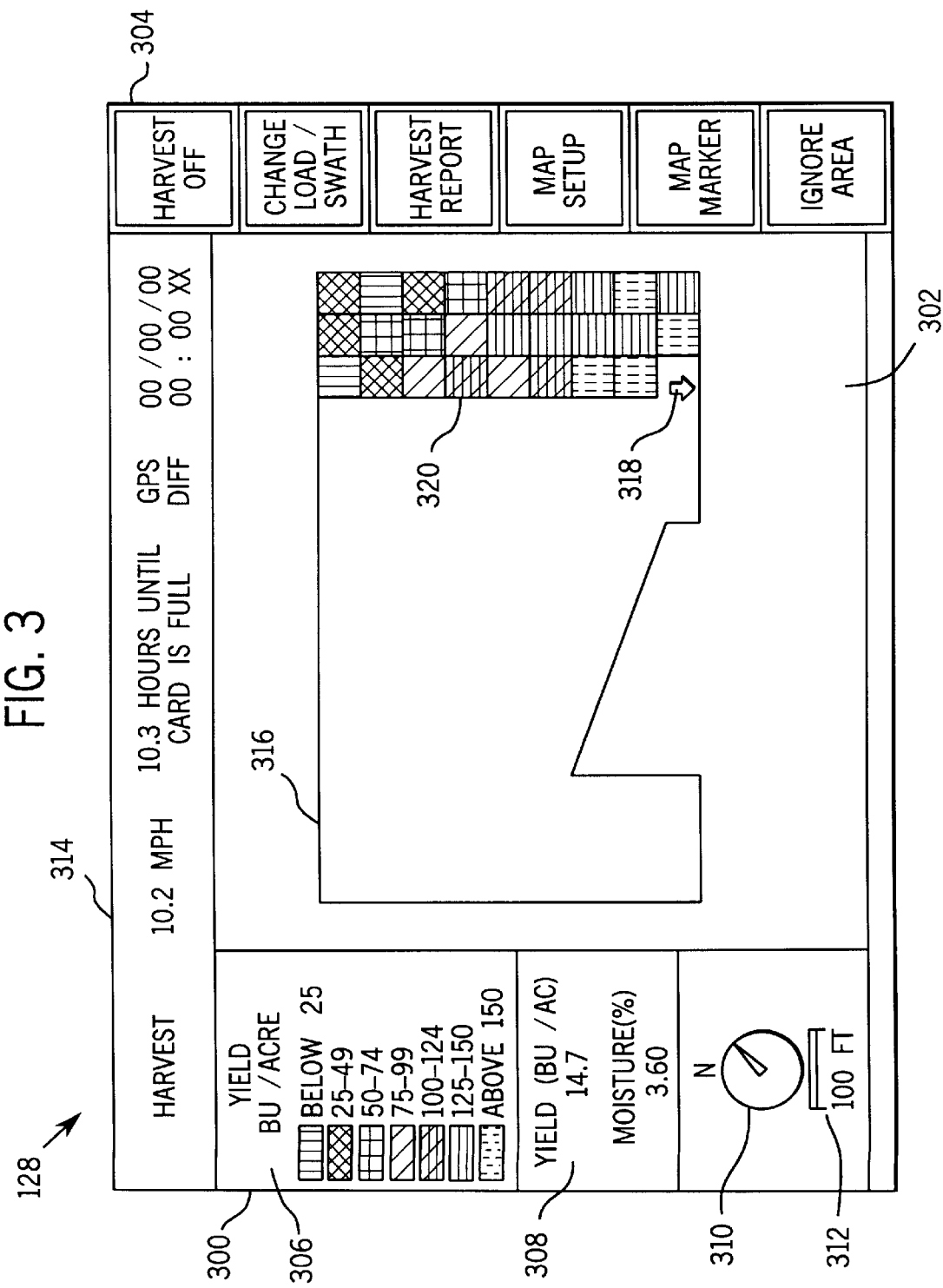

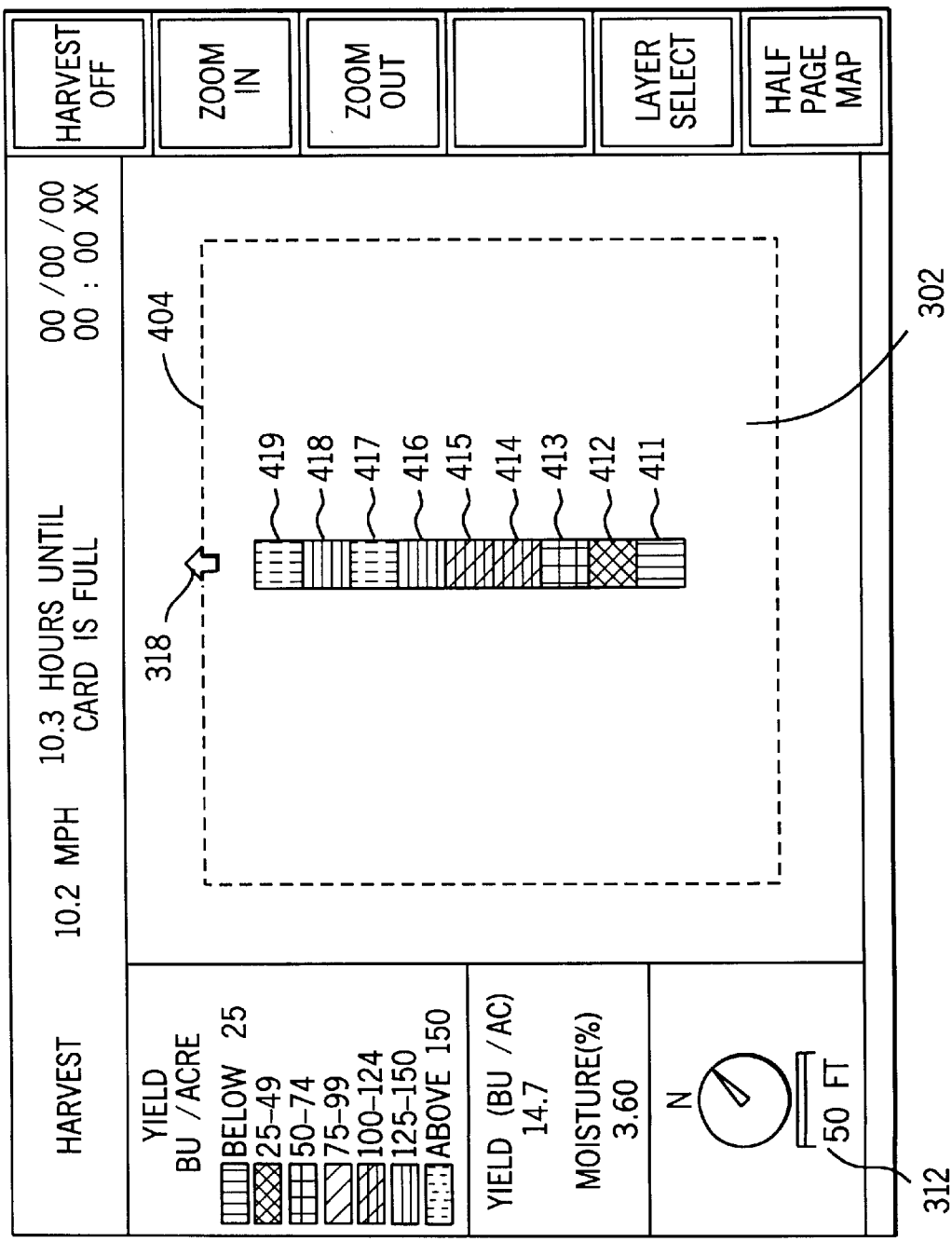

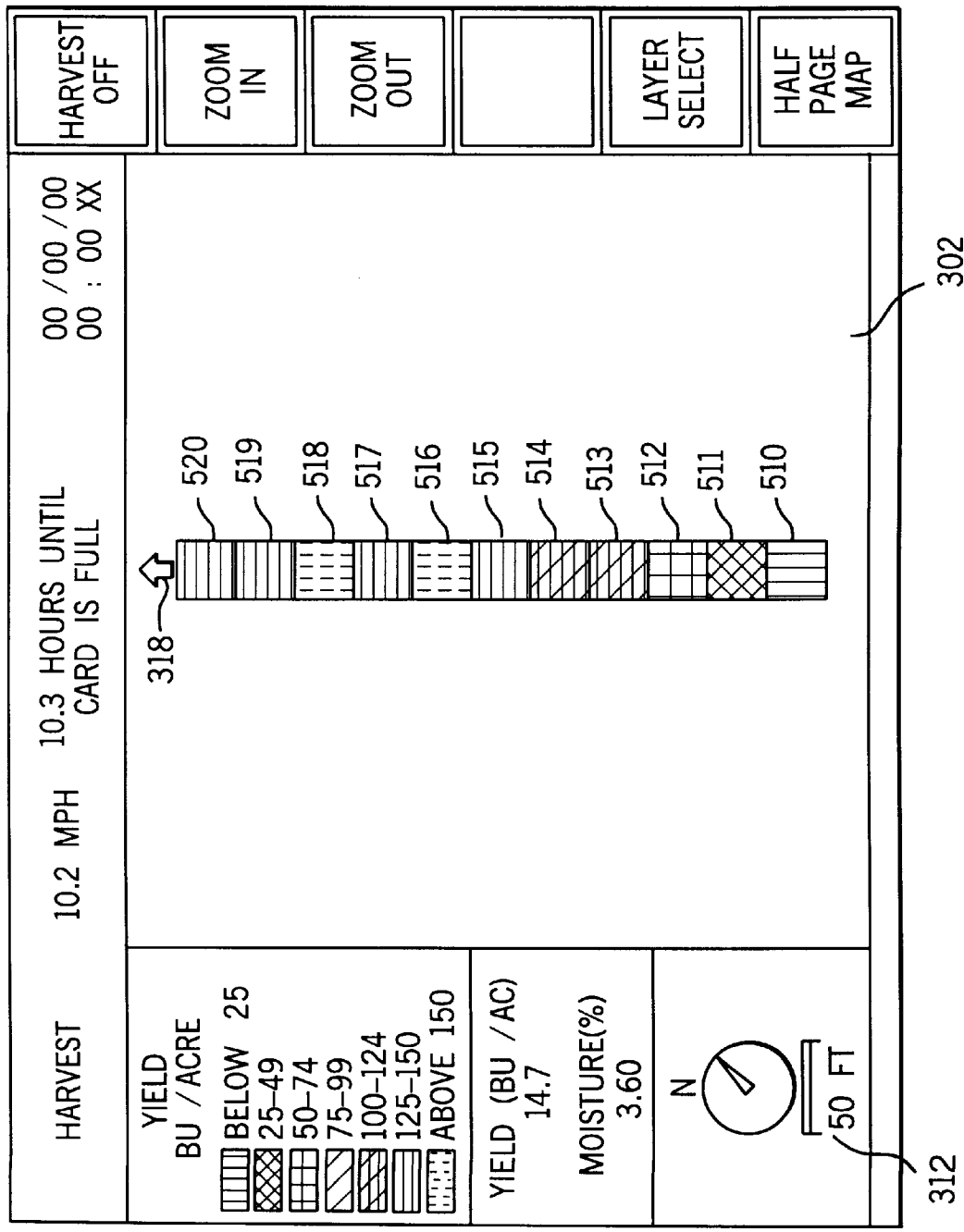

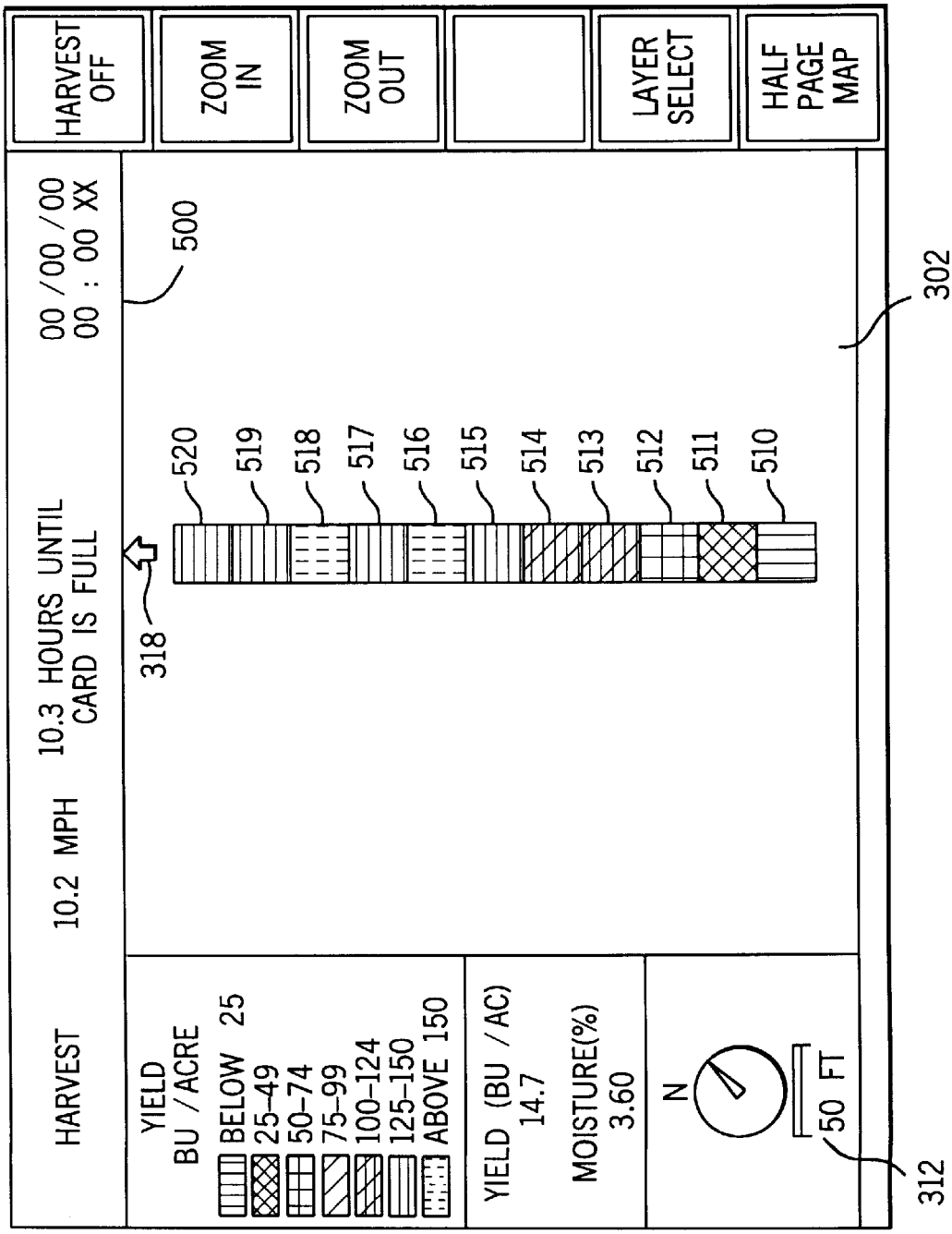

GLOBAL POSITION CORRECTION FOR THE ELECTRONIC DISPLAY OF FIELD MAPS

FIELD OF THE INVENTION

The present invention relates to sampling the characteristics of a field (e.g., grain moisture content, grain harvest yield, soil compaction, altitude, etc.) at a plurality of locations therein and displaying the characteristics on an electronic display located in an associated agricultural vehicle. In particular, the invention relates to generating an electronic display of a map of the field and indicia of the characteristics at locations on the map based upon position signals received by a global positioning system (GPS) receiver which is corrected using an offset signal from another source.

BACKGROUND OF THE INVENTION

Research within the agricultural community has shown that management of crop production may be optimized by taking into account spatial variations that often exist within a given farming field. For example, by varying the farming inputs applied to a field according to local conditions within the field, a farmer can optimize crop yield as a function of the inputs being applied while preventing or minimizing environmental damage. This management technique has become known as precision, site-specific, prescription or spatially-variable farming.

The management of a field using precision farming techniques requires the gathering and processing of data relating to site-specific characteristics of the field. Generally, site-specific input data is analyzed in real-time or off-line to generate a prescription map including desired application rates of a farming input. A control system reads data from the prescription map and generates a control signal which is applied to a variable-rate controller adapted to apply a farming input to the field at a rate that varies as a function of the location. Variable-rate controllers may be mounted on agricultural vehicles with attached variable-rate applicators, and may be used to control application rates for applying seed, fertilizer, insecticide, herbicide or other inputs. The effect of the inputs may be analyzed by gathering site-specific yield and moisture content data and correlating this data with the farming inputs, thereby allowing a user to optimize the amounts and combinations of farming inputs applied to the field.

The spatially-variable characteristic data may be obtained by manual measuring, remote sensing, or sensing during field operations. Manual measurements typically involve taking a soil probe and analyzing the soil in a laboratory to determine nutrient data or soil condition data such as soil type or soil classification. Taking manual measurements, however, is labor intensive and, due to high sampling costs, provides only a limited number of data samples. Remote sensing may include taking aerial photographs or generating spectral images or maps from airborne or spaceborne multispectral sensors. Spectral data from remote sensing, however, is often difficult to correlate with a precise position in a field or with a specific quantifiable characteristic of the field. Both manual measurements and remote sensing require a user to conduct an airborne or ground-based survey of the field apart from normal field operations.

Spatially-variable characteristic data may also be acquired during normal field operations using appropriate sensors supported by a combine, tractor or other vehicle. A variety of characteristics may be sensed including soil properties (e.g., organic matter, fertility, nutrients, moisture content, compaction and topography or altitude), crop properties (e.g., height, moisture content or yield), and farming inputs applied to the field (e.g., fertilizers, herbicides, insecticides, seeds, cultural practices or tillage techniques used). Other spatially-variable characteristics may be manually sensed as a field is traversed (e.g., insect or weed infestation or landmarks). As these examples show, characteristics which correlate to a specific location include data related to local conditions of the field, farming inputs applied to the field, and crops harvested from the field.

Obtaining characteristic data during normal field operations is advantageous over manual measuring and remote sensing in that less labor is required, more data samples may be taken, samples may be easier to correlate with specific positions and separate field surveys are not required. Some agricultural vehicles equipped with a sensor for detecting a site-specific characteristic "on the go" provide the user with a numerical display showing the instantaneous value of the characteristic. The cab in a combine, for example, may include a display showing instantaneous yield information (e.g., bu/acre) measured by a grain flow sensor. However, such a display does not show how the characteristic varies throughout an area of the field. Thus, it would be beneficial to provide a system for an agricultural vehicle which includes an electronic display showing a map of a field being worked and visible indicia of a sensed characteristic. Such a display may also show the position of the vehicle on the map. This type of display would provide feedback to a farmer while the field is being worked.

Providing such an electronic display, however, has been difficult because of the high accuracy required to determine the position of an agricultural vehicle within a field and the position at which a characteristic is sampled. Typical positioning systems (e.g., LORAN; GPS) have not been able to accurately distinguish between locations of a vehicle within a field. One navigation system for an on-road vehicle, such as an automobile, corrects for position error on GPS signals by assuming that the vehicle must be on a road defined on a stored digital map. For example, if the detected position of the vehicle is 10 feet from road X and 100 feet from road Y, the system corrects the position to place the vehicle on road X. Such a system, however, cannot correct position signals of an agricultural vehicle in a field since the vehicle may roam freely throughout the field.

SUMMARY OF THE INVENTION

Accordingly, the present invention provides a system for sampling data representative of spatially-variable characteristics of a field and accurately displaying the data on a map of the field. The invention also provides a system for sampling spatially-variable characteristics of a field and generating an image representative of the characteristics on a displayed map, wherein the positions at which the characteristics were sampled is determined from satellite-transmitted signals which are corrected by correction signals. The invention also provides a system for accurately portraying the progress of an agricultural vehicle as it traverses a field on an electronic display located in the vehicle. The invention also provides a system which may be used on both combines and tractors and which is operable in both harvest and apply modes.

One embodiment of the present invention provides a system configured to sample at least one characteristic relating to a geographic area at a plurality of locations within the geographic area. The system includes a vehicle moveable over the geographic area and a location signal generator supported by the vehicle which is configured to receive position signals from a plurality of satellites and to generate location signals representative of the plurality of locations within the geographic area. The system also includes a correction signal generator supported by the vehicle which is configured to receive correction signals and to generate offset signals for combination with the location signals to improve the accuracy of the location signals, and a sensing circuit supported by the vehicle to generate characteristic signals representative of a characteristic sampled at the plurality of locations within the geographic area. The system also includes a control circuit coupled to the location signal generator, the correction signal generator and the sensing circuit. The control circuit is configured to combine the location and offset signals to generate location data representative of the plurality of locations within the geographic area and to correlate the location data with characteristic data representative of the characteristic signals generated at the respective plurality of locations. The system also includes an electronic display including a display area supported by the vehicle and coupled to the control circuit. The control circuit is configured to scale the location data to correspond to the display area and to generate display signals which, when applied to the display, generate visible indicia of the characteristic data at the respective locations in the display area.

Another embodiment of the present invention provides a system configured to sample at least one characteristic relating to an agricultural field at a plurality of locations within the field. The system includes a vehicle moveable over the field and location means for generating location signals based upon signals received from a plurality of satellites, the location signals being representative of the plurality of locations of the vehicle within the field. The system also includes correction means for generating offset signals from correction signals transmitted to the vehicle, the offset signals being combined with the location signals to improve the accuracy of the location signals. The system also includes sensing means for generating characteristic signals representative of a characteristic sampled at the plurality of locations of the vehicle within the field, and control means for combining the location and offset signals to generate location data representative of the plurality of locations of the vehicle and correlating the location data with characteristic data representative of the characteristic signals generated at the respective plurality of locations. The system also includes an electronic display including a display area supported by the vehicle and coupled to the control means. The control means scales the location data to correspond to the display area and generates display signals which, when applied to the display, generates visible indicia of the characteristic data at the respective locations in the display area.

Another embodiment of the present invention provides a method for sampling at least one characteristic relating to an agricultural field at a plurality of locations within the field and generating indicia of the characteristic on the display area of an electronic display. The method includes the steps of moving a vehicle over the field and generating location signals based upon signals received from a plurality of satellites which are representative of the plurality of locations of the vehicle within the field. The method also includes the step of generating offset signals from correction signals transmitted to the vehicle, the offset signals being combined with the location signals to improve the accuracy of the location signals. The method also includes the steps of generating characteristic signals representative of a characteristic sampled at the plurality of locations of the vehicle and combining the location and offset signals to generate location data representative of the plurality of locations of the vehicle and correlating the location data to characteristic data representative of the characteristic signals generated at the respective plurality of locations. The method also includes the step of generating a visual representation of the characteristic data by scaling the location data to correspond to the display area and generating display signals which, when applied to the display, generate visible indicia of the characteristic data at the respective locations in the display area.

BRIEF DESCRIPTION OF THE DRAWINGS

The invention will become more fully understood from the following detailed description, taken in conjunction with the accompanying drawings, wherein like reference numerals refer to like parts, in which:

FIG. 3 shows a map of a farming field displayed on an electronic display in a vehicle cab which includes visible indicia of a characteristic of the field.

FIGS. 4A–4F show a sequence of maps of a farming field which include visible indicia of a characteristic of the field displayed on an electronic display when data representative of the characteristic is being gathered and the DPU of FIG. 1 is in a panning mode of operation.

FIGS. 5A–5C show a sequence of maps of a farming field which include visible indicia of a characteristic of the field displayed on an electronic display when data representative of the characteristic is being gathered and the DPU of FIG. 1 is in an automatic resealing mode of operation.

DETAILED DESCRIPTION OF THE PREFERRED EMBODIMENTS

Figure 1:
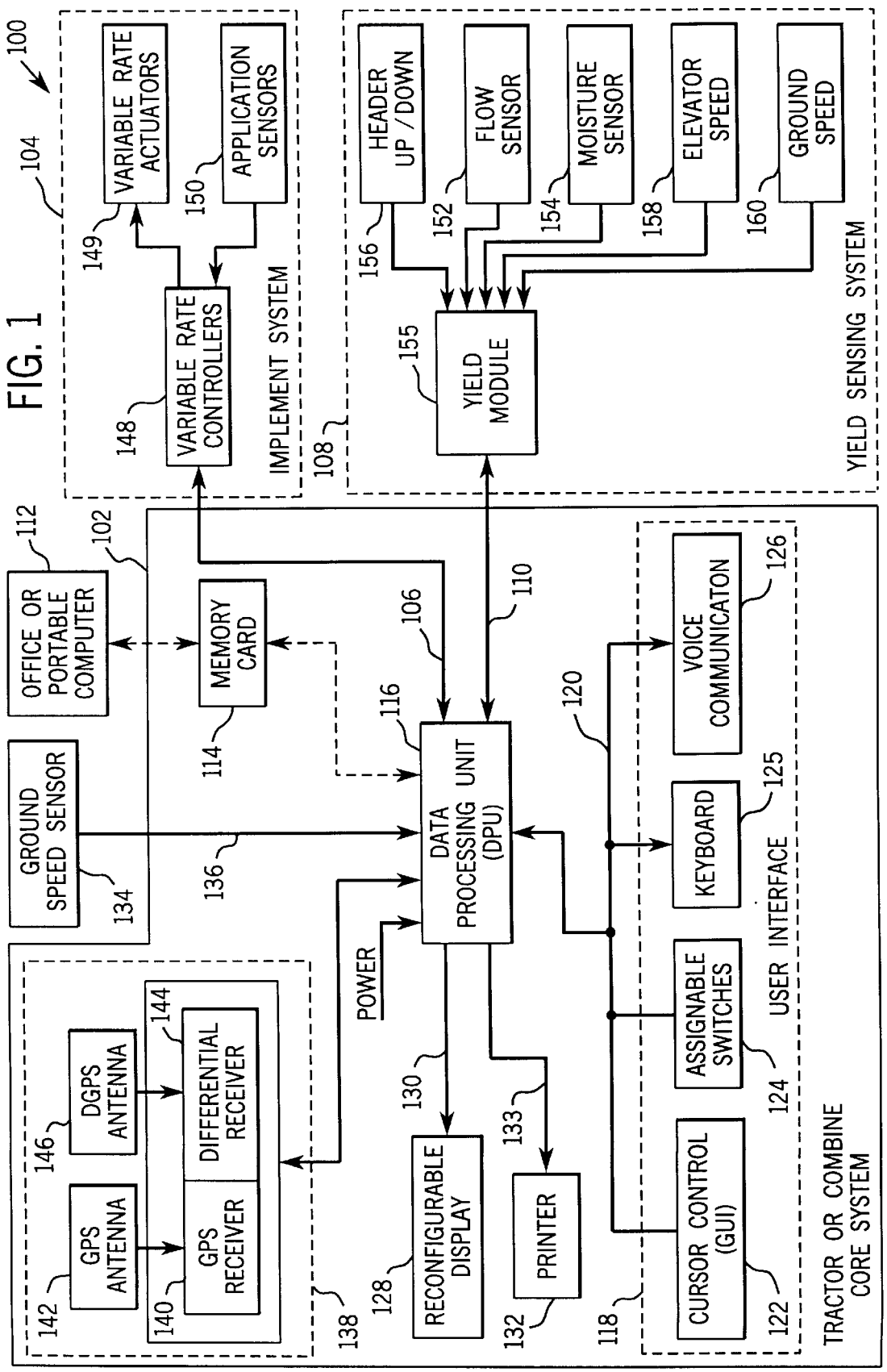
FIG. 1 is a block diagram illustrating a site-specific farming system including vehicles equipped with sensors for sampling site-specific characteristics of a field and electronic displays for displaying visible indicia of the characteristics in the vehicle cabs.

Referring to FIG. 1, a site-specific farming system 100 preferably includes one or more core systems 102 which provide data processing functions for different agricultural vehicles including tractors and combines. In a typical farming system 100, each tractor or combine is equipped with its own core system 102. Each tractor is also equipped with an implement system 104 appropriate for the task at hand, and core system 102 of the tractor communicates with implement system 104 over bus 106. Similarly, each combine is also equipped with a yield sensing system 108, and core system 102 of the combine communicates with yield sensing system 108 over bus 110.

Preferably, core system 102 is removable and can be installed on a variety of agricultural vehicles. When installed on a tractor equipped with implement system 104, core system 102 can be configured to operate in an "apply" mode wherein it collects, controls, records and displays application rate data. The displayed data may include either the desired application rate data (e.g., the prescription map) or the actual application rate data (e.g., the sensed feedback). When installed on a combine equipped with yield sensing system 108, core system 102 can be configured to operate in a "harvest" mode wherein it collects, records and displays harvest data (e.g., yield or moisture content). Core system 102 may also operate in a "scout" mode wherein it records and displays data observed and entered by an operator. Core system 102 may also provide directional or positional assistance during scouting or when collecting soil samples. Sensing and control functions that require specialized input and output processing are performed outside core system 102.

Farming system 100 also includes a workstation or personal computer 112 which may be located in the farm office or may be portable. A medium of communication is used to transfer site-specific data between core system 102 and computer 112. Preferably, core system 102 and computer 112 each include a read/write interface (not shown) for a removable memory card 114 which can be transported between core system 102 and computer 112. Memory cards 114 may be Type II PCMCIA cards made by Centennial Technologies, Inc. However, other mediums of communication (e.g., floppy or hard disk, RF, infrared, RS-232/485 links, etc.) may be used. Memory card 114 is used to transfer site-specific characteristic data from core system 102 to computer 112, and to transfer prescription maps from computer 112 to core system 102.

Core system 102 includes a general purpose data processing unit (DPU) 116 which communicates with the vehicle operator through a user interface 118 via links 120 (e.g., an RS-232/485 interface; a standard keyboard interface). DPU 116 includes a processor (e.g., a 486DX or Pentium® microprocessor) and various types of memory which may include non-volatile memory (PROM, EEPROM or FLASH) and volatile memory (RAM). The processor executes a program stored in the non-volatile memory and the volatile memory (RAM) may include a battery back-up circuit. Alternatively, DPU 116 may be implemented using dedicated, specific purpose equipment or hard-wired logic circuitry. User interface 118 includes a graphical user interface (GUI) 122 providing cursor control (e.g., a mouse, joystick or four-way switch with up, down, right and left positions), assignable switches 124 (e.g., push buttons) configurable by the processor, a keyboard 125, and a voice-communication interface 126.

DPU 116 is configured to generate display signals which are applied to a reconfigurable display 128 (e.g., a CRT, flat screen LCD display) via communication link 130. Display 128 is preferably an active-matrix LCD capable of displaying full-motion video and a number of colors under varying ambient light conditions. Display 128 is also capable of displaying graphics and alpha-numeric characters. Display 128 is used, inter alia, to display the current configurations of assignable switches 124. DPU 116, user interface 118 and display 128 are located in the vehicle cab such that the operator has easy access to user interface 118 and an unobstructed view of display 128. Core system 102 may also include a printer 132 in the cab which communicates with DPU 116 via an interface 133 (e.g., an RS-232 link).

DPU 116 receives signals representing the speed of the vehicle from ground speed sensor 134 via interface 136 (e.g., a frequency interface). Ground speed sensor 134 may include a magnetic pickup sensor configured to sense the speed of the vehicle's wheels or transmission, or may include a radar device mounted to the body of the vehicle. The speed signals may be used by DPU 116 to calculate distance travelled as described below.

DPU 116 also communicates with a location signal generation circuit 138 which generates location signals representing the vehicle's position. Circuit 138 may include a global positioning system (GPS) signal receiver 140 with an associated antenna 142, and a differential GPS (DGPS) signal receiver 144 with an associated antenna 146. A single antenna may be used in place of antennas 142 and 146. GPS receiver 140 may, for example, be manufactured by Trimble Navigation Ltd. of California, and DGPS receiver 144 may be manufactured by Satloc, Inc. of Arizona. GPS receiver 140 determines longitude and latitude coordinates (and altitude) of the vehicle from signals transmitted by the GPS satellite network. The accuracy of the position data is improved by applying correction signals received by DGPS receiver 144. The differential correction signals are used to correct errors present on GPS signals including the selective availability error signal added to GPS signals by the U.S. government. DPGS correction signals are transmitted by the U.S. Coast Guard and by commercial services. For example, the Omnistar DGPS system from John E. Chance & Assoc. of Texas includes a network of ten land-based differential reference stations which send correction signals to a master station which uploads signals to a satellite for broadcast throughout North America. GPS differential correction signals may also be transmitted from a local base station such as the top of a building. In a preferred embodiment, DPU 116 interfaces with the SATLOC L-Band Integrated TerraStar DGPS System via an RS-485 communication link.

When core system 102 is mounted on a tractor, DPU 116 communicates with implement system 104 via bus 106. Implement system 104 may include one or more variable-rate controllers 148, variable-rate actuators 149 and application sensors 150. DPU 116 reads application rate data for a particular field location from a prescription map (which may be supplied by computer 112), or reads an input device such as a potentiometer (not shown) used to manually set a desired application rate, and generates commands which are sent to variable-rate controllers 148. The command output rate is a function of the speed of the tractor and the desired application rate. For example, an increased speed will require an increased output rate to maintain a constant desired application rate. In response, controllers 148 generate control signals which are applied to variable-rate actuators 149. Application sensors 150 provide feedback signals representing the actual application rates to enable closed-loop control. Variable-rate application systems include, for example, a variable-rate planter controller from Rawson Control Systems of Iowa and a variable-rate fertilizer spreader from Soil Teq., Inc. of Minnesota. Bus 106 may be an RS-485 bus for a single-channel variable-rate controller, or a J-1939 implement bus for a multiple-channel controller.

The tractor may also include site-specific sensors configured to sense characteristics of a field during field operations and communicate the information to DPU 116, even if the tractor is not equipped with variablerate controllers. For example, a tractor pulling a plow may be equipped with sensors for monitoring site-specific characteristics (e.g., draft force; implement position) as a field is worked. A tractor with a hitch assembly control system with various sensors is described in U.S. Pat. No. 5,421,416, commonly assigned and incorporated herein by reference. A tractor, as used herein, includes various agricultural vehicles attached to implements such as planters, spreaders or fertilizers.

When core system 102 is mounted on a combine, DPU 116 communicates with yield sensing system 108 via link 110, which may carry RS-232/485 signals. Yield sensing system 108 typically includes a yield flow sensor 152 and a moisture sensor 154. Yield flow sensor 152 may include an impact-type mass flow rate sensor attached to a steel plate which is struck by grain passing through the clean-grain elevator of the combine to measure the force of the grain flow. Moisture sensor 154 may be a capacitive-type sensor mounted on the underside of the grain tank loading auger of the combine to measure the moisture content of grain passing near the sensor. Moisture sensor 154 may include a grain temperature sensor to compensate the grain moisture signals for temperature. DPU 116 receives sensed signals from flow sensor 152 and moisture sensor 154, and receives location signals from location signal generation circuit 138 which represent the positions of the combine where grain flow and moisture content were sampled. The grain flow and moisture content signals are processed to form data representative of-the respective characteristic, and this data is correlated with location data representative of the location signals. Correlated data is stored in memory card 114 or in another memory.

To convert the grain flow signals into yield data, the distance travelled by the combine is determined by multiplying the combine's speed by elapsed time. The speed may be based upon signals sensed by speed sensor 134, or may be determined by calculating the difference between successive position signals received from location signal generation circuit 138 and dividing by elapsed time. The yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance travelled.

In one embodiment, DPU 116 receives RS-485 serial communication signals from a yield module unit (YMU) 155 which is configured to perform data processing for yield sensing system 108. Using a separate YMU off-loads data processing functions from DPU 116, and minimizes wiring between the combine and the DPU. YMU 155 receives sensed signals from flow sensor 152, moisture sensor 154, a header up/down sensor 156, an elevator speed sensor 158 and a ground speed sensor 160. Header up/down sensor 156 senses the position of the combine's header to detect whether the combine is harvesting. When header position is above a pre-programmed value, YMU 155 assumes the combine is not harvesting and yield information is not calculated. A system for controlling and displaying the status of a combine header is described in U.S. Pat. No. 5,465,560, commonly assigned and incorporated herein by reference. Elevator speed sensor 158 senses the speed of the clean grain elevator to determine the speed at which grain passes through the elevator. Signals from sensor 158 may be used to compensate the yield calculations for the delay before harvested grain is sensed. Ground speed sensor 160 senses ground speed of the combine, and may be the same as ground speed sensor 134, or similar to it.

YMU 155 uses signals from sensors 152, 154, 156, 158 and 160 to calculate and communicate yield and moisture content data to DPU 116 via bus 110. The update rate at which data is communicated may be once per second. YMU 155 may provide instantaneous yield and moisture content data, and may also provide field and load total (summary) values for grain weight, wet and dry bushels, average moisture, area harvested and dry yield. Thus, YMU 155 allows specific yield processing functions to be moved from DPU 116. Alternatively, YMU 155 may send raw sensed data to DPU 116 and the DPU may perform the calculations. However, farming system 100 could also be configured such that DPU 116 reads the signals directly from the sensors.

Core system 102 may communicate with other vehicle systems over a vehicle data bus (not shown). Preferably, the vehicle data bus conforms to the standards of SAE J-1939 ("Recommended Practice for a Serial Control and Communications Vehicle Network"). A bridge circuit may be used to facilitate the transfer of data between the vehicle data bus and a secondary implement bus coupled to implement system 104 and DPU 116. The bridge circuit may be used to filter data between busses, thereby decreasing bus loading.

Figure 2:
FIG. 2 represents a data structure in which a layer of data representing a spatially-variable characteristic of a farming field is stored in memory.

FIG. 2 generally represents the structure in which a layer of site-specific data representing a characteristic of a farming field is stored in memory. The structure may be referred to as a georeferenced digital map, or a layer of data. The structure is preferably implemented using a database 200 (e.g., a geographical information system (GIS) database) represented by the table shown in FIG. 2, wherein each row represents a characteristic data point taken at a location in the field. For example, a layer having 5000 data points is represented by a table having 5000 rows. Columns of information are associated with each data point. For example, the columns shown in FIG. 2 include yield data (bu/acre), moisture content, and the longitude and latitude coordinates at which each data point was sampled. Additional columns (not shown) may include flow rate, GPS time, combine serial number (S/N), field identification, type of grain (e.g., corn), and altitude. The data structure of FIG. 2 represents, for example, a yield layer. Data in the first row (Data Point No. 1) indicates that flow sensor 152 and moisture sensor 154 of the combine sensed grain flow corresponding to a yield of 32.0739 bu/acre and a moisture content of 17.7, respectively, at a location defined by longitude and latitude coordinates −88.7291520 and 39.0710720. Similar structures may be used to store other layers of data. For example, a pH layer may include a row for each data point and columns for pH, longitude and latitude.

Referring to FIG. 3, DPU 116 uses the characteristic data and correlated location data to generate display signals which cause display 128 to plot a map of a field which includes visible indicia of the characteristic. In the example shown in FIG. 3, the screen 300 of electronic display 128 includes a map display area 302, a graphical operator interface 304 to show the current configuration of assignable switches 124, a legend block 306, a status block 308 for displaying statistical data (average yield and moisture content) of the field, a compass indicator 310 to show the heading of the vehicle, a map scale 312, and a status line 314 for displaying status information such as operating mode ("harvest" or "apply"), vehicle speed, time remaining until memory card 114 is full, GPS and DGPS status (e.g., good or bad) and date/time. The graphical symbols and their positions within screen 200 are shown for illustration only and may be modified. For example, map display area 302 may cover any portion or all of screen 300, with other displayed information superimposed or suppressed if necessary.

FIG. 3 represents an exemplary display when core system 102 is mounted on a combine equipped with yield flow sensor 152 and moisture sensor 154, and the combine is harvesting grain. In this example, the boundaries of the field being harvested are defined and are stored in memory. After entering a "harvest" mode of operation in response to actuation of one of assignable switches 124, DPU 116 accesses the longitude and latitude coordinates of the field boundary from memory and scales the field boundary to substantially correspond to a portion of map display area 302. DPU 116 scales the boundary data and produces display signals which, when applied to display 128, generate a visible map 316 of the field within the portion of the map display area 302. The portion of map display area 302 which is used to display map 316 may be 80%, 85% or 90% of the size of map display area 302, with the percentage selected to enhance the visual appearance of map 316. However, any percentage value may be used which provides a desirable appearance, including 100%, and the percentage may be set by the user. The scale of map 316 is displayed at map scale 312 (e.g. 100 ft/inch).

At the start of the harvest, the combine was located at the upper-right hand corner of map 316. The combine then made a number of passes through the field, turning at the headlands (located at the boundaries of map 316). The current location of the combine is marked by an icon 318, such as an arrow which also indicates the direction of travel which may be determined from changes in the location data. Other icons may be used (e.g., a drawing of a combine). Throughout harvesting, DPU 116 gathers site-specific data sensed by flow sensor 152 and moisture sensor 154 and correlates the sensed data with the locations at which the sensed data was sampled using signals from location signal generation circuit 138. The data may be sampled, for example, at 1 second intervals. The correlated data is stored in memory (e.g., memory card 114) for later analysis by office computer 112. DPU 116 may be configured to not calculate yield data based upon an indication that the combine is not harvesting (e.g., header position is above a threshold position).

DPU 116 provides an indication of the time remaining before memory card 114 is filled up by yield data during "harvest" mode, or by actual application rate data during "apply" mode when core system 102 is on a tractor. The time remaining equals the amount of memory currently free multiplied by the time since the start of harvesting or application, divided by the difference between the amount of memory free at the start and the amount of memory currently free. The result of the calculation is displayed in status line 314 (e.g., "10.3 Hours Until Card is Full"). Alternatively, DPU 116 may display the portion or percentage of memory card 114 filled up.

DPU 116 may also provide an indication of the estimated time remaining until sampling of the field is complete (i.e., estimated time to complete harvesting or application). The estimated time to complete equals the time since the start of harvesting or application multiplied by the difference between the area of map 316 within the boundaries and the area harvested, divided by the area harvested. The result is displayed on display 128 (e.g., "Estimated Time to Complete is 3.5 Hours"). Alternatively, DPU 116 may display the portion or percentage of the field that has been worked.

To accurately correlate location data with sensed characteristic data, DPU 116 is preferably programmed with variables, which may be set by the operator, which indicate the distance and direction between GPS antenna 142 and the sampled location of the field (i.e., between antenna 142 and the combine's header or the tractor's implement). This information is used as an offset to correct the location data stored with the sensed data. Also, to compensate for the time required for grain entering the header of the combine to reach flow sensor 152, DPU 116 is programmed with a delay value (e.g., 10 seconds). Sensed data is correlated with the location data received 10 seconds earlier. Thus, no data will be sensed and no data will be plotted until 10 seconds after harvesting starts. In one embodiment, DPU 116 maintains a buffer of the last 20 positions received, and selects a position to use based upon the delay value.

The characteristic data and correlated location data are used to produce a display signal in real-time which, when applied to display 128, generates visible indicia of the characteristic data at corresponding locations of map 316. DPU 116 gathers characteristic data over "square" areas of the field where the sides of the square are substantially equal to the width of cut of the combine (or the width of the implement). Other shapes or blocks could also be used such as rectangles where the width is equal to the width of cut and the length is equal to the distance traversed in some time interval. Data within each block is automatically processed or filtered (e.g., averaged). Averaging data as it is plotted eliminates the need to plot every data point, thereby decreasing visual noise on display 128. If desired, the blocks of data could be stored in memory rather than the raw data to reduce the memory storage and subsequent processing requirements. The average value of the data in each block, and location data associated with the block (appropriately scaled), are used to produce the display signal applied to display 128. In response, display 128 generates visible blocks 320 which include visible indicia of the average characteristic value at corresponding locations of map 316.

Characteristic data may be visually represented on display 128 in several ways. In a preferred embodiment, distinguishable colors represent different ranges of the average data in each visible block. For example, the colors red, orange, yellow, green, cyan, blue and violet may represent increasing ranges of average yield. Legend 306 displays each color and its associated yield range: below 25 (red); 25–49 (orange); 50–74 (yellow); 75–99 (green); 100–124 (cyan); 125–150 (blue); and above 150 bu/acre of corn (violet). When a moisture map is displayed, the default colors and ranges are: 0–7% (red); 7–14% (orange); 14–21% (yellow); 21–28% (green); 29–35% (cyan); 35–42% (blue); and above 42% (violet). The ranges and colors could also be selectable by the user.

In one embodiment, the user selects an average value of the characteristic for the field and the ranges are based on the average value, with green centered at the average. For example, each color may represent a yield range of 5 bu/acre if the selected average yield is 50 bu/acre or less, a range of 10 bu/acre if the selected average yield is 50 to 125 bu/acre, or a range of 15 bu/acre if the selected average yield is 125 bu/acre or more. In each case, the range limits are rounded to the next whole number (e.g., green=48–53 bu/acre for a selected average yield of 50 bu/acre), and out of range values are displayed using the appropriate end color (i.e., red or violet). Alternatively, ranges may be represented by alpha-numeric characters or by different light intensity levels or grey scales.

Graphical operator interface 304 includes a label which shows the assignment currently selected for each switch 124. The label and assignment depend on the mode of operation of DPU 116. Indicator 310 is an electronic compass which shows the current direction or heading of the vehicle with respect to north (e.g., northeast in FIG. 3). DPU 116 may calculate the heading based on a vector from the previous location of the vehicle to the current location. Appropriate filtering should be used to keep the compass from changing direction due to GPS errors when the vehicle is not moving. Alternatively, the vehicle may be equipped with a compass or gyroscope electronically interfaced with DPU 116. In FIG. 3, the orientation of the display shows the vehicle going up and down as it travels northeast. However, the orientation of the display could also be geographic (e.g., north up).

Although the display shown in FIG. 3 is useful, core system 102 can generate visual maps of a field which may be preferable to the operator in certain situations. For example, in a large field which requires an agricultural vehicle to make many passes, the size of data blocks 320 may become very small due to scaling if display 128 shows the entire field. The small size may make it difficult to monitor the sensed characteristic as the field is worked. Even if the data blocks are relatively large compared to the size of the field, as in FIG. 3, much of the display screen remains blank until corresponding data is gathered. Blank space does not provide characteristic information and does not make optimum use of screen 300. In addition, it may be difficult to determine the scale factor to use when the map borders are undefined and not available for scaling the location data.

Accordingly, core system 102 provides alternative formats for displaying characteristic data in real-time as it is being gathered. The first alternative format, referred to as "panning", is illustrated by the sequence of maps shown in FIGS. 4A–4F and the second alternative format, referred to as "auto resealing", is illustrated by the sequence of maps shown in FIGS. 5A–5C. In each format, the displayed map is dynamically changed to keep the vehicle on the display screen. For clarity, each map sequence is described in relation to plotting a yield map as a field of grain is harvested. However, the sequence is similar for other characteristic data (e.g., moisture content) which may be selected by the user.

Figure 4A:
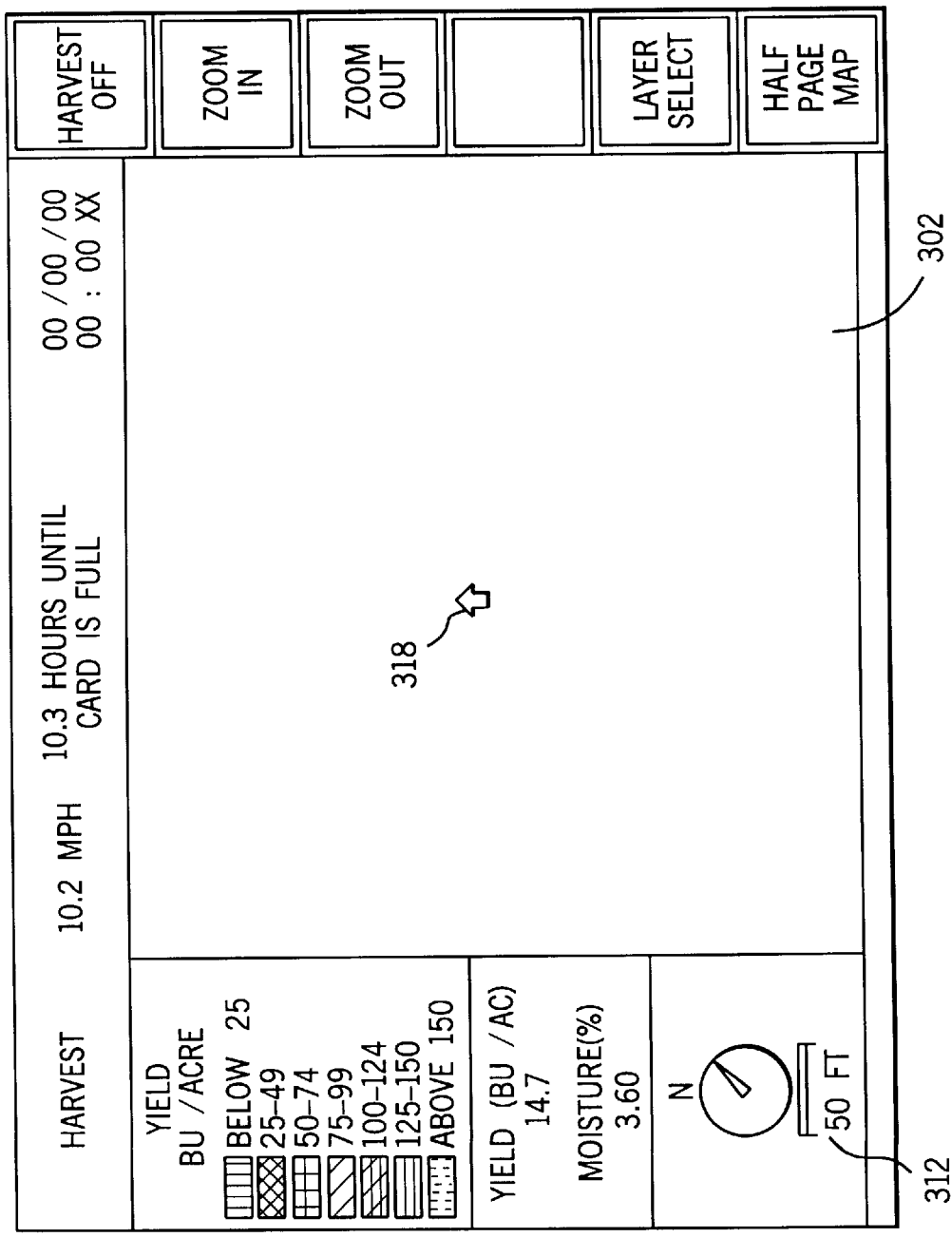

Referring to FIG. 4A, an operator input to DPU 116 indicates that harvest is about to begin. The operator may, if desired, enter a farm name and field name into DPU 116 to label the field being harvested. Once the vehicle starts to move, DPU 116 generates display signals which, when applied to electronic display 128, generates icon 318 substantially at the center of map display area 302. The center position corresponds to the current location of the vehicle determined from location signals received from location signal generation circuit 138. The scale of the map is set to a default value (e.g., 50 ft/inch) shown by map scale 312.

Figure 4B:
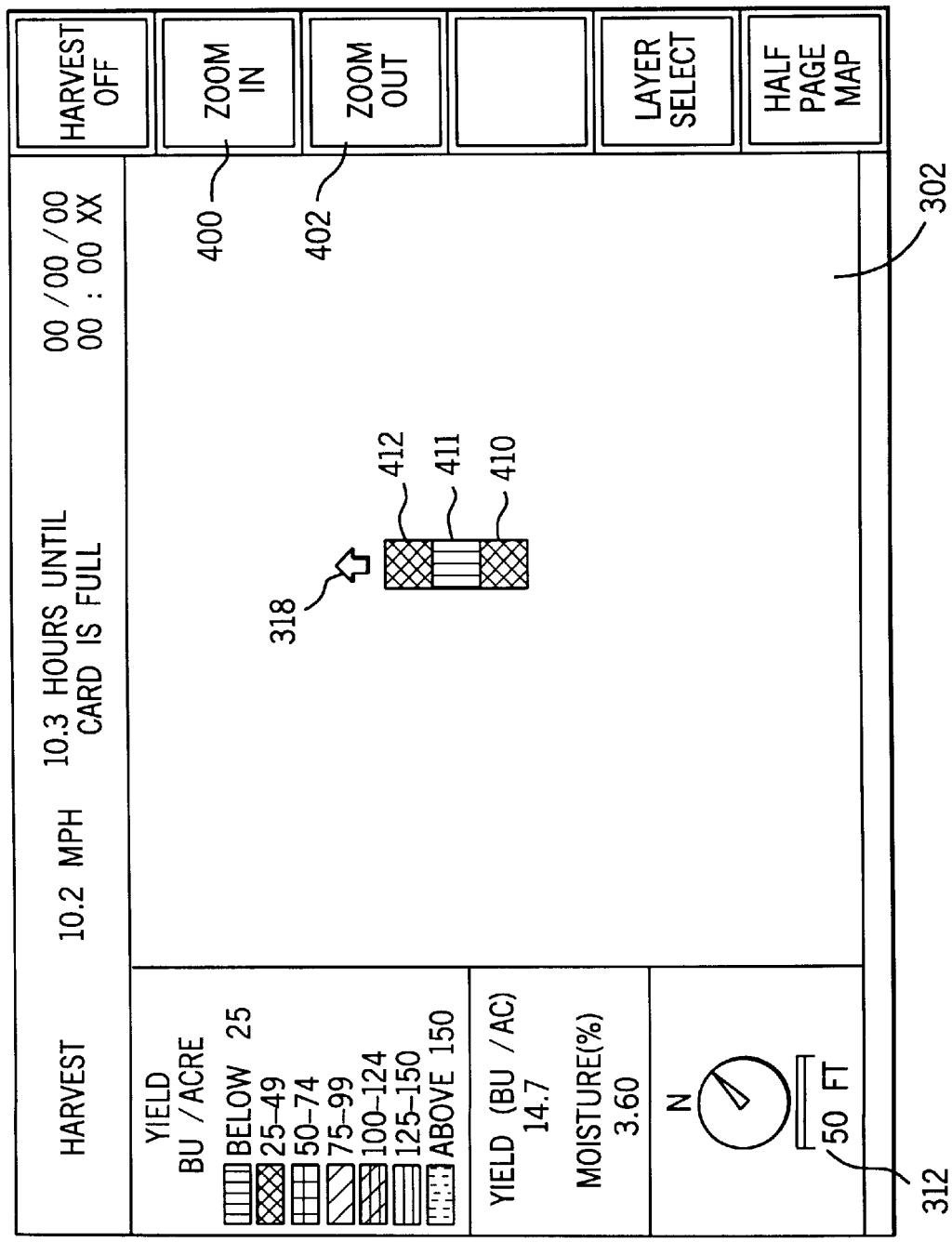

Referring to FIG. 4B, the combine has traveled to the location in the field represented by icon 318. The combine has traveled a distance equal to three times the width of cut and yield data received from flow sensor 152 has been processed and correlated with location data for three blocks 410, 411 and 412 of data. Average yield data for first block 410 and third block 412 was in the range of 25–49 bu/acre and the average yield for the second block 411 was below 25 bu/acre. The color for each block was computed by comparing the average yield for the block with the yield ranges for the colors. The comparison results caused DPU 116 to produce display signals which, when applied to display 128, have caused display 128 to draw an orange block, red block, and orange block, respectively, along the path of travel.

In FIG. 4B, all of the selected data (i.e., yield) is shown on display 128 using the default scale value of 50 ft/inch. This view may be referred to as the maximum zoomed out view since all of the selected data is shown. However, DPU 116 allows a user to change the scale (e.g., between 50, 100, 200, 400, etc. ft/inch) by configuring assignable switches 124 to include a ZOOM IN switch 400 and a ZOOM OUT switch 402. Each actuation of ZOOM IN switch 400 decreases the map scale by a fraction (e.g., multiply by ½). Each actuation of ZOOM OUT switch 402 increases the scale by the inverse of the fraction (e.g., multiply by 2). The maximum zoomed in view is limited to a certain scale (e.g., 50 ft/inch). Thus, if the scale was currently 100 ft/inch, an actuation of ZOOM IN switch 400 would change the scale from 100 to 50 ft/inch and the size of each block 410–412 would double. A subsequent actuation of ZOOM OUT switch 402 would switch the scale back to 100 ft/inch and the size of each block would revert to its original size.

Figure 4C:
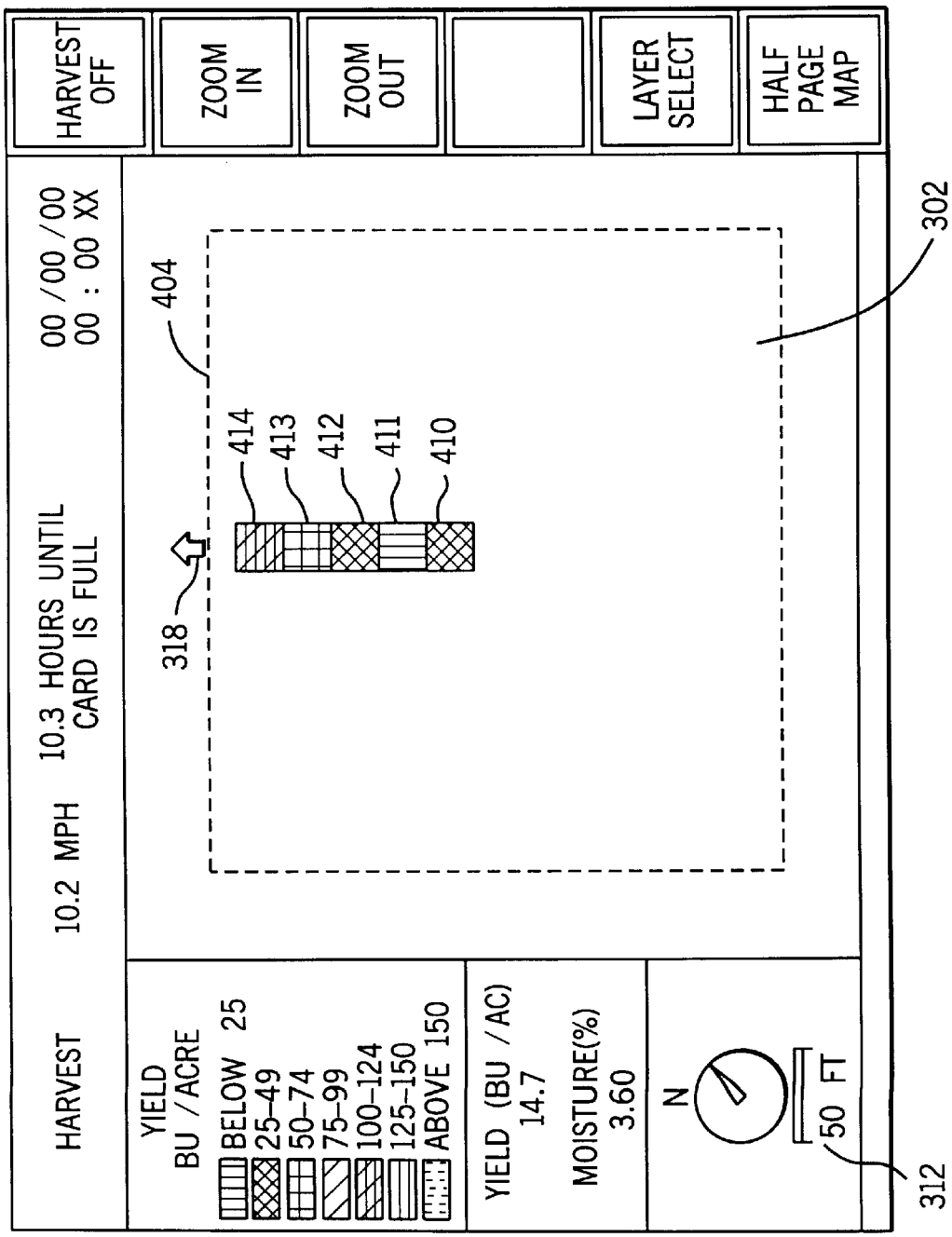

Referring to FIG. 4C, the combine has traveled to the location in the field represented by icon 318 and core system 102 has plotted two more blocks of data 413 and 414. Block 414 is the last block of data that can be plotted inside of an invisible rectangular region 404 preferably centered in map display area 302, and icon 318 shows that the combine has just moved outside of region 404. Region 404 covers a portion of map display area 302, such as 80, 85, 90 or even 100%. Since the vehicle is still traveling in the same direction, as shown by icon 318, region 404 has no room for another block.

Figure 4D:
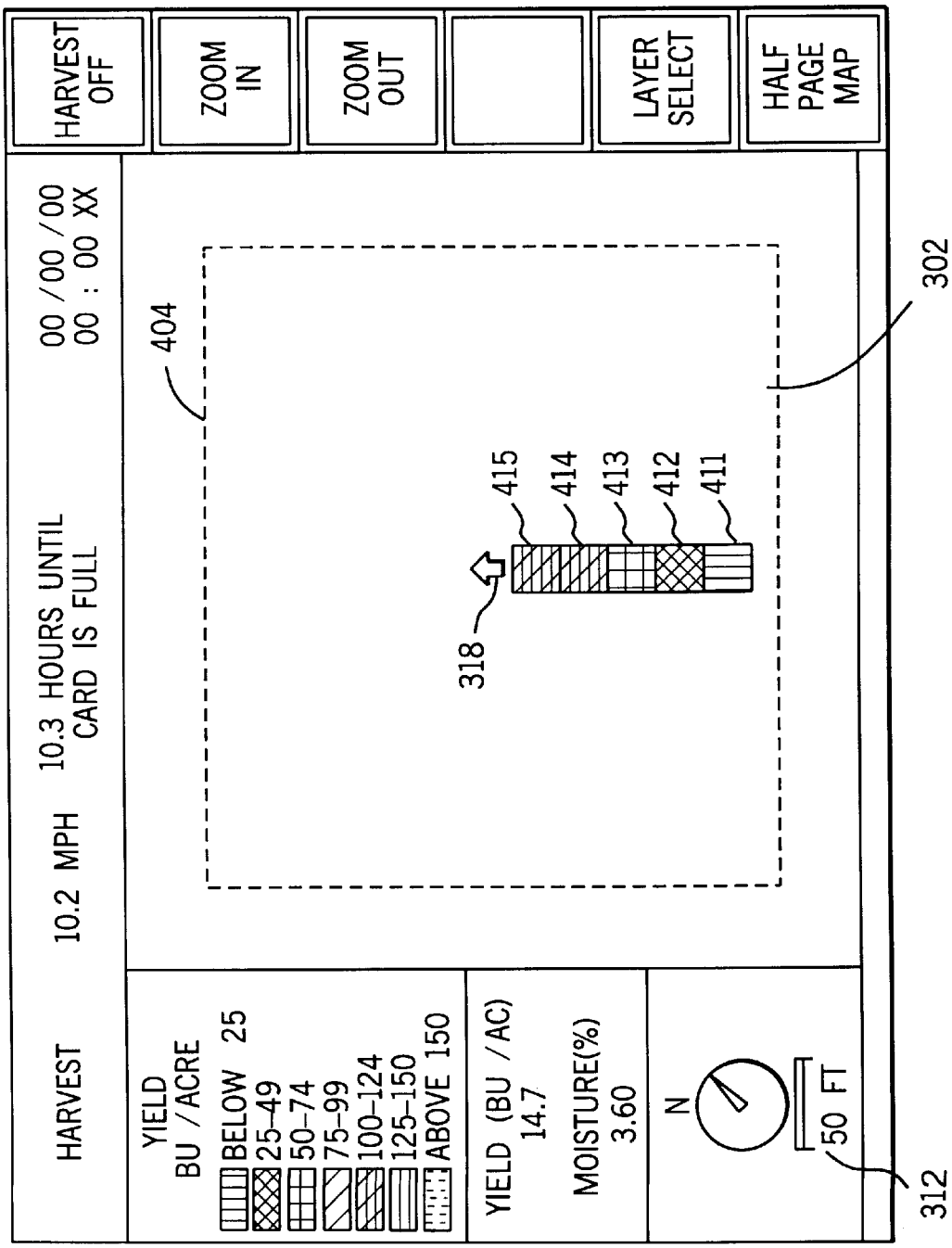

Referring to FIG. 4D, after the location of the combine moves outside of region 404 in FIG. 4C, the map of the field represented by blocks 411–415 is redrawn such that icon 318 is again centered in map display area 302. To redraw the display, DPU 116 recalculates the boundaries of the area that will be displayed such that the current location is centered. However, the map is not rescaled in the panning display format (see scale 312). Thus, while a newly processed block 415 is displayed, first data block 410 is no longer displayed since it is mapped outside of the display area.

Figure 4F:
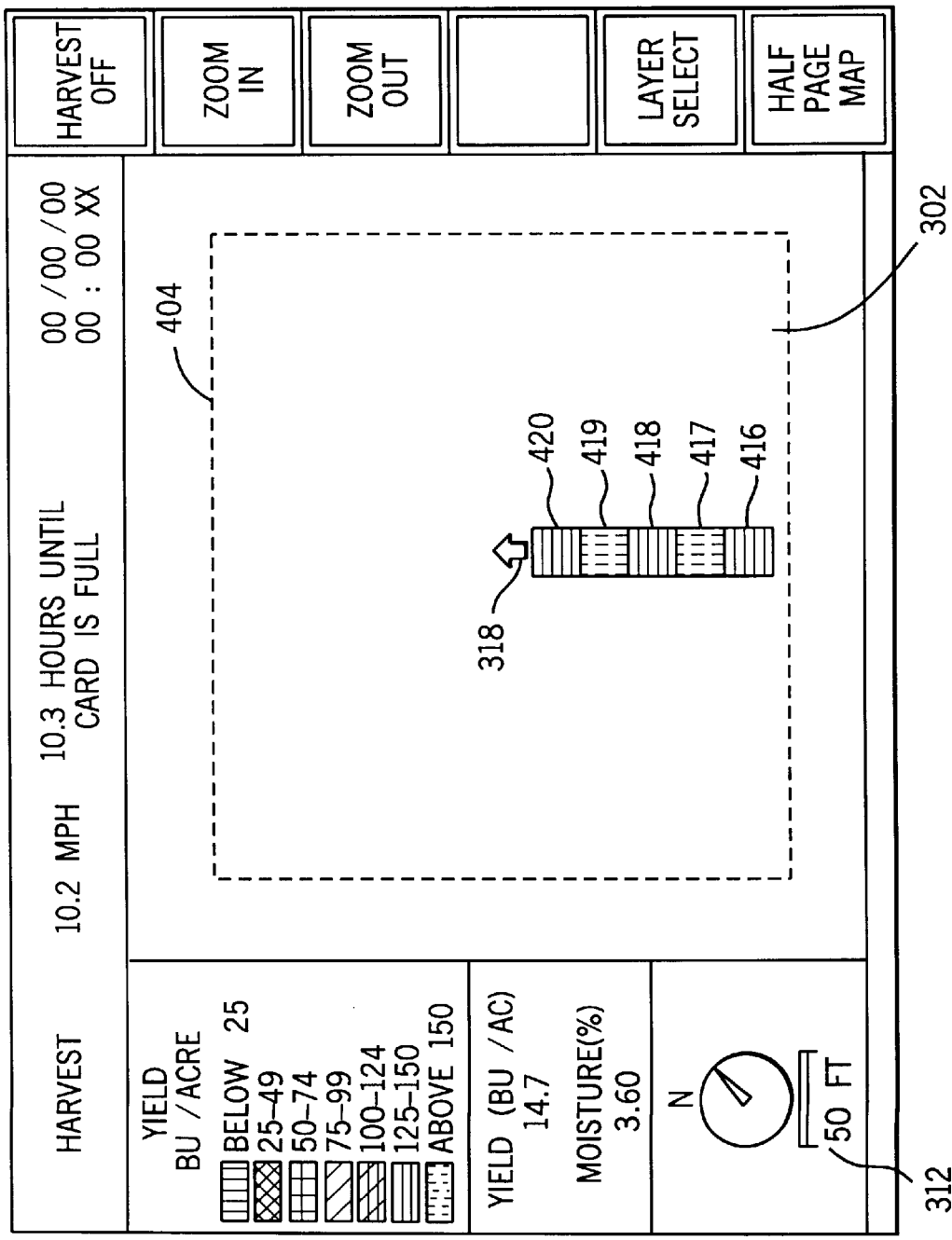

Referring to FIG. 4E, the combine has continued to travel and has again begun to move outside of region 404. Four new data blocks 416–419 have been processed and plotted. Referring to FIG. 4F, the combine moved outside region 404 in FIG. 4E, and the map represented by the data blocks has been redrawn such that icon 318 is again centered in map display area 302. Again, the scale of the map has not changed (see scale 312). A new data block 420 is displayed but data blocks which no longer correspond with map display area 302, such as blocks 411–415, are no longer displayed.

As shown in the map sequence of FIGS. 4A–4F, all of the selected data is not displayed in the panning display format. Thus, panning format is used when the zoom is not set to the maximum zoom out. When the vehicle moves outside region 404, the map is redrawn with the vehicle in the center of map display area 302. Since the map is not rescaled, data at locations no longer corresponding to map display area 302 are not displayed. Thus, only data within a fixed distance of the vehicle is displayed.

Although the maps of FIG. 4 show the vehicle moving vertically on screen 300, the panning format is used whenever the vehicle leaves region 404 regardless of direction. Also, if the vehicle were to turn around, data blocks which had been displayed previously will reappear as the vehicle reaches nearby locations.

When the panning format is used, the displayed map remains relatively stationary since it is redrawn only when the vehicle moves beyond region 404. This is advantageous compared with a display system which always keeps the vehicle centered on the map since such a map must be constantly redrawn. The stability of the map decreases the computation needed to redraw the map, and makes the map easier to view since it is not constantly being redrawn and is not constantly shifting.

Core system 102 remains in the panning mode until the user zooms out to the maximum zoom out where all the data is displayed on the map. At this point, the map is drawn using a custom scaling such that the displayed map uses some portion of the map display area, such as 80, 85, 90 or even 100% of the map display area. Then, the system switches into the automatic resealing display format. Alternatively, an operator could select the automatic resealing display format at the start of the harvest.

Figure 5C:
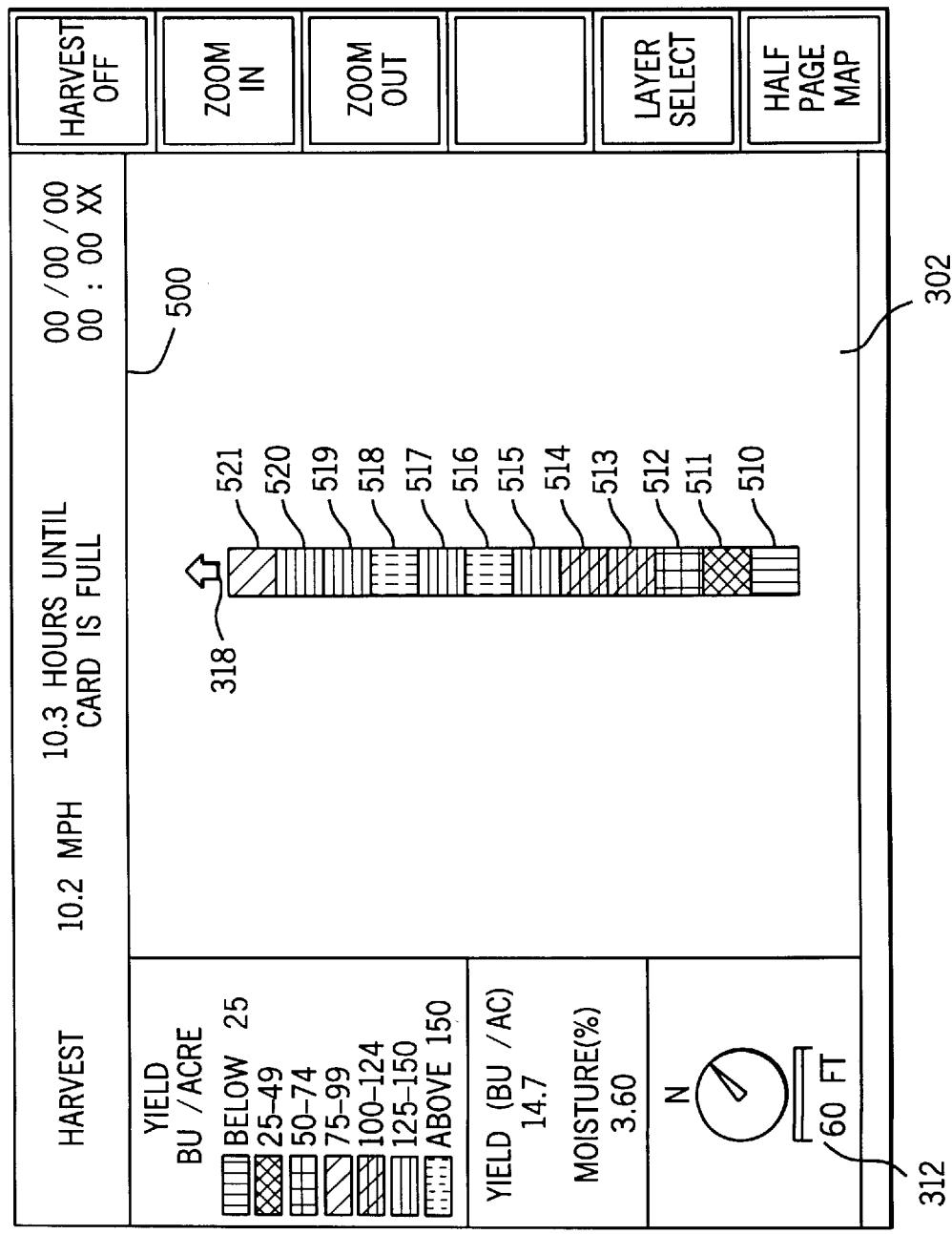

The automatic resealing display format is explained in reference to FIGS. 5A–5C. As stated above, automatic resealing is used when all the gathered data is displayed (i.e., in maximum zoom out). Referring to FIG. 5A, the combine is making a first pass through the field and is at the location in the field represented by icon 318. As shown by map scale 312, a default scale of 50 ft/inch is used. Core system 102 has plotted blocks of data 510–520 along the path of the combine on display 128.

Referring to FIG. 5B, the combine is at a location in the field which substantially corresponds to a border 500 of map display area 302 (i.e., the location is at or close to border 500, such as within 10, 15 or 20% of the border). A new data block 521 (not shown in FIG. 5B) has been processed and is ready to be plotted, but there is no room for block 521 in map display area 302.

Referring to FIG. 5C, DPU 116 responds by rescaling the geographic area defined by blocks 510–521 such that the map represented by blocks 510–521 appears smaller by some percentage (e.g., 20%). The rescaled or resized map is displayed and centered in map display area 302. As shown by map scale 312, the map was automatically resized or rescaled from 50 ft/inch to 60 ft/inch (e.g., 20%).

As shown in the map sequence of FIGS. 5A–5C, all of the selected data is displayed when automatic resealing display format is used. Thus, automatic resealing is used when the zoom is set to maximum zoom out. When the vehicle leaves map display area 302, the geographic area defined by the data blocks is automatically rescaled and the map is redrawn in the center of map display area 302. Thus, the characteristic data surrounding the vehicle is displayed at distances from icon 318 that decrease as the defined field is enlarged.

The automatic resealing display format is used until ZOOM IN switch 400 is actuated. At this point, all of the selected data can no longer be displayed. Thus, the map is rescaled to the next smallest allowed distance (e.g., 500, 1000, 2000, etc. ft/inch) around the vehicle and the panning format is used.

Although the above examples describe the generation of a yield map in the cab of a combine during harvesting, the system described herein may also be used to draw maps of moisture content or other site-specific data collected during harvesting. The system may also be used to draw a map of other site-specific characteristic data in the cab of a tractor or other agricultural vehicle. For example, the system may be used to draw a map showing the actual or the desired application rate of fertilizer, herbicide, water, insecticide or seed when operated in "apply" mode on a tractor. Other site-specific map data may include soil type, soil fertility, soil moisture content, soil compaction, pH, crop height, insect or weed infestation, landmarks, field borders or topography (e.g., altitude). Soil compaction, for example, may be measured by sensing draft force exerted by the ground on an implement such as a plow, and correcting for the plow's depth using a position signal.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A system configured to sample at least one characteristic relating to a geographic area at a plurality of locations within the geographic area, the system comprising:
    a vehicle moveable over the geographic area;
    a location signal generator supported by the vehicle, the location signal generator configured to receive position signals from a plurality of satellites and to generate location signals representative of the plurality of locations within the geographic area;
    a correction signal generator supported by the vehicle, the correction signal generator configured to receive correction signals and to generate offset signals for combination with the location signals to improve the accuracy of the location signals;
    a sensing circuit supported by the vehicle to generate characteristic signals representative of a characteristic sampled at the plurality of locations within the geographic area;
    a control circuit coupled to the location signal generator, the correction signal generator and the sensing circuit, the control circuit configured to combine the location and offset signals to generate location data representative of the plurality of locations within the geographic area and to correlate the location data with characteristic data representative of the characteristic signals generated at the respective plurality of locations; and
    an electronic display including a display area supported by the vehicle and coupled to the control circuit, the control circuit configured to scale the location data to correspond to the display area and to generate display signals which, when applied to the display, generate visible indicia of the characteristic data at the respective locations in the display area.

2. The system of claim 1, wherein the location signal generator includes a GPS transducer configured to receive global position signals, and the location signal generator generates the location signals based upon the global position signals.

3. The system of claim 2, wherein the correction signal generator includes a DGPS transducer configured to receive differential correction signals, and the correction signal generator generates the offset signals based upon the differential correction signals.

4. The system of claim 2, wherein the vehicle is a combine including a grain conveyor which generates a flow of grain, the sensing circuit includes a grain flow sensor supported by the combine to sense the grain flow, and the characteristic is yield.

5. The system of claim 4, wherein the indicia include a plurality of colors with different colors representing different yields.

6. The system of claim 2, wherein the vehicle is a combine including a grain conveyor which generates a flow of grain, the sensing circuit includes a moisture sensor supported by the combine to sense grain moisture, and the characteristic is grain moisture content.

7. The system of claim 6, wherein the indicia include a plurality of colors with different colors representing different grain moisture contents.

8. The system of claim 2, wherein the sensing circuit includes a ground compaction sensor to sense the hardness of the ground and the characteristic is ground compaction.

9. The system of claim 1, further comprising a memory circuit coupled to the control circuit and having a capacity, wherein the control circuit is configured to store the characteristic data and the location data correlated with the characteristic data in the memory circuit and to generate display signals which, when applied to the display, generate an indication of the remaining capacity of the memory circuit simultaneously with the visible indicia of the characteristic data at the respective locations in the display area.

10. The system of claim 9, wherein the memory circuit is a removable memory card and the indication represents the time remaining until the memory card is full.

11. The system of claim 1, wherein the control circuit is further configured to determine the sampled area over which the vehicle has moved and to compare the sampled area to the total geographic area, and to generate display signals which, when applied to the display, generate an indication of the remaining area to be sampled.

12. The system of claim 11, where in the indication represents the time remaining until the total geographic area is sampled.

13. The system of claim 1, wherein the control circuit is further configured to generate display signals which, when applied to the display, generate an indication of the current location of the vehicle.

14. The system of claim 13, wherein the control circuit is further configured to compare the current location data with the previous location data to determine the heading of the vehicle, and to generate display signals which, when applied to the display, generate an indication of the current heading of the vehicle.

15. The system of claim 14, wherein the indication of the current location of the vehicle and the indication of the current heading of the vehicle consist of a single icon.

16. The system of claim 1, further comprising an operator input device configured to generate an input signal and a second sensing circuit supported by the vehicle and coupled to the control circuit to generate second characteristic signals representative of a second characteristic sampled at the plurality of locations within the geographic area, wherein the vehicle is a combine including a grain conveyor which generates a flow of grain, the first sensing circuit includes a grain flow sensor and the second sensing circuit includes a moisture sensor, and the control circuit is configured to generate a display signal which, when applied to the display, generates visible indicia of either yield or moisture content depending upon the input signal.

17. The system of claim 1, wherein a core system comprises the location signal generator, the correction signal generator, the control circuit and the electronic display, and the core system is configured to generate a yield map when the core system is mounted in a combine and generate an application map when mounted in a tractor.

18. The system of claim 1, wherein the control circuit is configured to periodically correlate the location data with the characteristic data at a predetermined period and to generate the display signals which, when applied to the display, generate visible indicia of the periodically correlated characteristic data.

19. The system of claim 1, wherein the predetermined period is approximately one second.

20. A system configured to sample at least one characteristic relating to an agricultural field at a plurality of locations within the field, the system comprising:

a vehicle moveable over the field;

location means for generating location signals based upon signals received from a plurality of satellites, the location signals being representative of the plurality of locations of the vehicle within the field;

correction means for generating offset signals from correction signals transmitted to the vehicle, the offset signals being combined with the location signals to improve the accuracy of the location signals;

sensing means for generating characteristic signals representative of a characteristic sampled at the plurality of locations of the vehicle within the field;

control means for combining the location and offset signals to generate location data representative of the plurality of locations of the vehicle and correlating the location data with characteristic data representative of the characteristic signals generated at the respective plurality of locations; and an electronic display including a display area supported by the vehicle and coupled to the control means, the control means scaling the location data to correspond to the display area and to generate display signals which, when applied to the display, generates visible indicia of the characteristic data at the respective locations in the display area.

21. The system of claim 20, wherein the location means includes GPS transducer means for receiving global position signals, and the location means generates the location signals based upon the global position signals.

22. The system of claim 21, wherein the correction means includes DGPS transducer means for receiving differential correction signals, and the correction means generates the offset signals based upon the differential correction signals.

23. The system of claim 21, wherein the vehicle is a combine including a grain conveyor which generates a flow of grain, the sensing means includes a grain flow sensor supported by the combine to sense the grain flow, and the characteristic is yield.

24. The system of claim 21, wherein the vehicle is a combine including a grain conveyor which generates a flow of grain, the sensing means includes a moisture sensor supported by the combine to sense grain moisture, and the characteristic is grain moisture content.

25. The system of claim 21, wherein the sensing means includes a ground compaction sensor to sense the hardness of the ground and the characteristic is ground compaction.

26. The system of claim 20, wherein the control means periodically correlates the location data with the characteristic data at a predetermined period and generates the display signals which, when applied to the display, generate visible indicia of the periodically correlated characteristic data.

27. A method for sampling at least one characteristic relating to an agricultural field at a plurality of locations within the field and generating indicia of the characteristic on the display area of an electronic display, the method comprising the steps of:

moving a vehicle over the field;

generating location signals based upon signals received from a plurality of satellites, the location signals being representative of the plurality of locations of the vehicle within the field;

generating offset signals from correction signals transmitted to the vehicle, the offset signals being combined with the location signals to improve the accuracy of the location signals;

generating characteristic signals representative of a characteristic sampled at the plurality of locations of the vehicle;

combining the location and offset signals to generate location data representative of the plurality of locations of the vehicle and correlating the location data to characteristic data representative of the characteristic signals generated at the respective plurality of locations; and generating a visual representation of the characteristic data by scaling the location data to correspond to the display area and generating display signals which, when applied to the display, generate visible indicia of the characteristic data at the respective locations in the display area.

28. The method of claim 27, wherein the step of generating location signals includes receiving global position signals and generating the location signals based upon the global position signals.

29. The method of claim 28, wherein the step of generating offset signals includes receiving differential correction signals and generating the offset signals based upon the differential correction signals.

30. The method of claim 29, wherein the vehicle is a combine including a grain conveyor which generates a flow of grain, the step of generating characteristic signals includes sensing the grain flow, and the characteristic is yield.

31. The method of claim 29, wherein the vehicle is a combine including a grain conveyor which generates a flow of grain, the step of generating characteristic signals includes sensing the grain moisture content, and the characteristic is grain moisture content.

32. The method of claim 29, wherein the step of generating characteristic signals includes sensing the hardness of the ground and the characteristic is ground compaction.

33. The method of claim 27, wherein the correlating step includes periodically correlating the location data to the characteristic data at a predetermined period and the generating step includes generating the display signals which, when applied to the display, generate visible indicia of the periodically correlated characteristic data.

34. A system configured to sample at least one characteristic relating to a geographic area at a plurality of locations within the geographic area, the system comprising:
   a vehicle moveable over the geographic area;
   a location signal generator supported by the vehicle, the location signal generator configured to receive position signals from a plurality of satellites and to generate location signals representative of the plurality of locations within the geographic area;
   a first characteristic circuit supported by the vehicle to generate first characteristic signals representative of a first characteristic sampled at the plurality of locations within the geographic area;
   a second characteristic circuit supported by the vehicle to generate second characteristic signals representative of a second characteristic at the plurality of locations within the geographic area;
   a control circuit coupled to the location signal generator, the first characteristic circuit and the second characteristic circuit, the control circuit configured to generate location data based on the location signals, to correlate the location data with first characteristic data representative of the first characteristic signals received from the first characteristic circuit, and to generate second characteristic data from the second characteristic signals; and
   an electronic display including a display area and an input device configured to generate an input signal, the electronic display supported by the vehicle and coupled to the control circuit, the control circuit configured to scale the location data to correspond to the display area and to generate display signals which, when applied to the electronic display, generate visible indicia of one of the first and second characteristic data depending upon the input signal.

35. The system of claim 34, wherein the second characteristic circuit includes a memory to store the second characteristic signals.

36. The system of claim 35, wherein the second characteristic signals are used to create a prescription map.

37. The system of claim 36, wherein the vehicle is a tractor, the first characteristic circuit includes an application sensor to sense the application rate of a product being applied by the tractor, and the control circuit is configured to generate the display signals which, when applied to the electronic display, generate visible indicia of one of the prescription map and the application rate depending upon the input signal.

38. The system of claim 34, wherein the second characteristic signals are representative of a second characteristic sampled at the plurality of locations within the geographic area, and the control circuit is configured to correlate the location data with second characteristic data representative of the second characteristic signals received from the second characteristic circuit.

39. The system of claim 38, wherein the vehicle is a combine including a grain conveyor which generates a flow of grain, the first characteristic circuit includes a grain flow sensor to sense the flow of grain, the second characteristic circuit includes a moisture sensor to sense moisture of the flow of grain, and the control circuit is configured to generate the display signals which, when applied to the electronic display, generate visible indicia of one of yield and moisture content depending upon the input signal.

40. The system of claim 34, wherein the location signal generator includes a correction signal generator configured to receive correction signals and to generate offset signals for combination with the position signals to improve the accuracy of the location signals.

41. The system of claim 34, wherein a core system comprises the location signal generator, the control circuit and the electronic display, and the core system is configured to generate a yield map when the core system is mounted in a combine and generate an application map when mounted in a tractor.

42. A system configured to sample at least one characteristic relating to a geographic area at a plurality of locations within the geographic area, the system comprising:
   a vehicle moveable over the geographic area;
   a location signal generator supported by the vehicle, the location signal generator configured to receive position signals from a plurality of satellites and to generate location signals representative of the plurality of locations within the geographic area;
   a sensing circuit supported by the vehicle to generate characteristic signals representative of a characteristic sampled at the plurality of locations within the geographic area;
   a control circuit coupled to the location signal generator and the sensing circuit, the control circuit configured to generate location data from the location signals and to correlate the location data with characteristic data representative of the characteristic signals;
   an electronic display including a display area supported by the vehicle and coupled to the control circuit, the control circuit configured to scale the location data to correspond to the display area and to generate display signals which, when applied to the electronic display, generate visible indicia of the characteristic data at the respective locations in the display area; and
   a memory circuit coupled to the control circuit and having a capacity, wherein the control circuit is configured to store the characteristic data and the location data correlated with the characteristic data in the memory circuit and to generate display signals which, when applied to the electronic display, generate an indication of the remaining capacity of the memory circuit simultaneously with the visible indicia of the characteristic data at the respective locations in the display area.

43. The system of claim 42, wherein the memory circuit is a removable memory card and the indication represents the time remaining until the memory card is full.

44. The system of claim 42, wherein the control circuit is further configured to determine the sampled area over which the vehicle has moved and to compare the sampled area to a total geographic area, and to generate display signals which, when applied to the electronic display, generate an indication of the remaining area to be sampled, wherein the indication of the remaining area to be sampled represents the time remaining until the total geographic area is sampled.

45. The system of claim 42, further comprising an operator input device configured to generate an input signal and a second sensing circuit supported by the vehicle and coupled to the control circuit to generate second characteristic signals representative of a second characteristic sampled at the plurality of locations within the geographic area, wherein the control circuit is configured to generate second characteristic data from the second characteristic signals and to generate display signals which, when applied to the electronic display, generates visible indicia of one of the first and second characteristic data depending upon the input signal.

* * * * *